United States Patent
Kwon et al.

(10) Patent No.: US 12,147,709 B2
(45) Date of Patent: Nov. 19, 2024

(54) STORAGE DEVICE DETERMINING A POLICY FOR FETCHING COMMANDS FROM A PLURALITY OF COMMAND QUEUES, AND METHOD THEREOF

(71) Applicant: SK hynix Inc., Icheon (KR)

(72) Inventors: Kang Rak Kwon, Icheon (KR); Seon Ju Lee, Icheon (KR)

(73) Assignee: SK hynix Inc., Icheon (KR)

( * ) Notice: Subject to any disclaimer, the term of this patent is extended or adjusted under 35 U.S.C. 154(b) by 97 days.

(21) Appl. No.: 18/160,040

(22) Filed: Jan. 26, 2023

(65) Prior Publication Data
US 2024/0078042 A1   Mar. 7, 2024

(30) Foreign Application Priority Data
Sep. 7, 2022   (KR) .................. 10-2022-0113590

(51) Int. Cl.
*G06F 3/06*   (2006.01)
(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0604; G06F 3/0659; G06F 3/0673; G06F 3/0611; G06F 3/0679
See application file for complete search history.

(56) References Cited

U.S. PATENT DOCUMENTS

| | | | |
|---|---|---|---|
| 2017/0123729 A1* | 5/2017 | Watanabe | ............. G06F 3/0604 |
| 2019/0043593 A1 | 2/2019 | Guo et al. | |
| 2023/0065395 A1* | 3/2023 | Walker | .................. G06F 3/0604 |

FOREIGN PATENT DOCUMENTS

KR   1020050077520 A   8/2005

* cited by examiner

*Primary Examiner* — Jane W Benner

(57) ABSTRACT

A storage device may fetch commands from a plurality of command queues. The storage device may determine a policy for fetching commands from the plurality of command queues as a first policy or a second policy on the basis of the state of a target command queue among the plurality of command queues. The policy may control an order in which commands are fetched from the plurality of command queues.

12 Claims, 9 Drawing Sheets

STORAGE DEVICE DETERMINING A POLICY FOR FETCHING COMMANDS FROM A PLURALITY OF COMMAND QUEUES, AND METHOD THEREOF

CROSS-REFERENCE TO RELATED APPLICATION

The present application claims priority under 35 U.S.C. § 119(a) to Korean Patent Application No. 10-2022-0113590 filed on Sep. 7, 2022, which is incorporated herein by reference in its entirety.

BACKGROUND

1. Technical Field

Various embodiments generally relate to a storage device which determines a policy for fetching a command from a plurality of command queues, and a method thereof.

2. Related Art

A storage device is a device which stores data on the basis of a request of a host such as a computer, a mobile terminal such as a smartphone and a tablet, or various electronic devices.

The storage device may include a controller for controlling a memory (e.g., a volatile memory or a nonvolatile memory). The controller may receive a command from the host, and may execute or control an operation for reading, writing, or erasing data with respect to the memory included in the storage device, on the basis of the received command.

In order to receive a command, the storage device may fetch the command from a plurality of command queues which are located outside the storage device.

SUMMARY

Various embodiments are directed to a storage device and a method thereof, capable of preventing a problem in which a requirement for a command processing time is not satisfied due to a delay in processing a specific command.

In an embodiment, a storage device may include: i) a command fetch circuit configured to fetch commands from a plurality of command queues; and ii) a controller configured to determine, according to a state of a target command queue among the plurality of command queues, a policy for the command fetch circuit to use to fetch commands from the plurality of command queues by selecting one from among a first policy and a second policy.

In an embodiment, a method for operating a storage device may include: i) determining a state of a target command queue among a plurality of command queues; ii) determining a policy for fetching commands from the plurality of command queues, by selecting one from among a first policy and a second policy on the basis of the state of the target command queue; and iii) fetching commands from the plurality of command queues on the basis of the determined policy.

In an embodiment, a controller may include: i) a memory interface capable of communicating with a memory capable of storing data; and ii) a control circuit configured to determine, based on the number of commands queued in a target command queue among a plurality of command queues, an order for fetching commands queued in a plurality of command queues, and process operations indicated by commands fetched from the plurality of command queues.

According to the embodiments of the disclosed technology, it is possible to prevent a problem in which a requirement for a command processing time is not satisfied due to a delay in processing a specific command.

DETAILED DESCRIPTION

Figure 1:
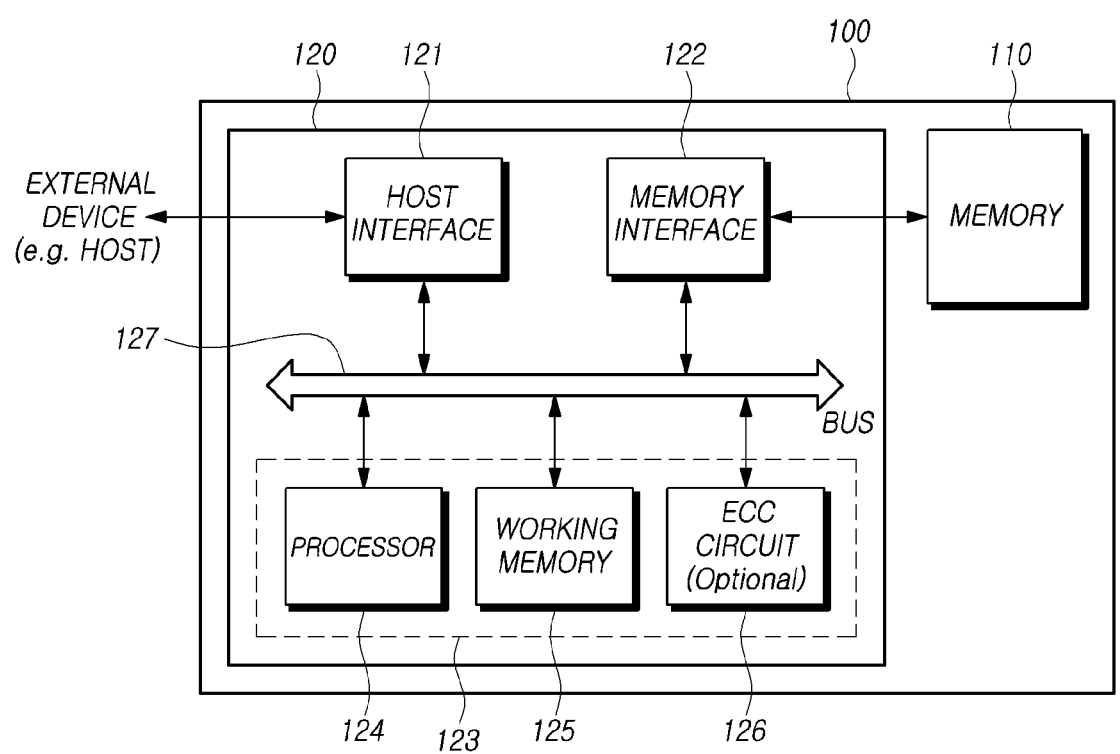
FIG. 1 is a schematic configuration diagram of a storage device according to an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein.

Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

Hereinafter, embodiments of the present disclosure will be described in detail with reference to the accompanying drawings.

FIG. 1 is a schematic configuration diagram of a storage device 100 according to an embodiment of the disclosed technology.

The storage device 100 may include a memory 110 which stores data, and a controller 120 which controls the memory 110.

The memory 110 includes a plurality of memory blocks, and operates in response to the control of the controller 120. Operations of the memory 110 may include, for example, a read operation, a program operation (also referred to as a write operation), and an erase operation.

The memory 110 may include a memory cell array including a plurality of memory cells (also simply referred to as "cells") which store data. Such a memory cell array may exist in a memory block.

For example, the memory 110 may be realized into various types such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (SU-RAM).

The memory 110 may be implemented as a three-dimensional array structure. The embodiment of the disclosed technology may be applied to a flash memory in which a charge storage layer is configured by a conductive floating gate or to a charge trap flash (CTF) in which a charge storage layer is configured by a dielectric layer.

The memory 110 may receive a command and an address from the controller 120 and may access an area which is selected by the address in the memory cell array. In other words, the memory 110 may perform an operation indicated by the command on the area selected by the address.

For example, the memory 110 may perform a program operation, a read operation, and an erase operation. In this connection, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase, and background operations for the memory 110. For example, the background operation may include at least one among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. On the other hand, the controller 120 may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of traveling under human control or autonomous driving, etc.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices which are separated from each other. As the case may be, the controller 120 and the host may be implemented by being integrated into one device. Hereunder, for the sake of convenience in explanation, it will be described as an example that the controller 120 and the host are devices which are separated from each other.

Referring to FIG. 1, the controller 120 may include a memory interface 122 and a control circuit 123, and may further include a host interface 121.

The host interface 121 provides an interface for communication with the host. For example, the host interface 121 may provide an interface which uses at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operation of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host, by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110, by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 to be described based on the embodiment of the disclosed technology may be implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one among a flash translation layer (FTL) which performs a translating function between a logical address requested to the storage device 100 from the host and a physical address of the memory 110, a host interface layer (HIL) which serves to analyze a command requested to the storage device 100 as a storage device from the host and transfer the command to the flash translation layer (FTL), and a flash interface layer (FIL) which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware in which a logic calculation to be performed is defined is stored in the memory 110 but is not loaded in the working memory 125, the processor 124 may generate an event (e.g., an interrupt) for loading the corresponding part of the firmware into the working memory 125 from the memory 110.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data which are necessary to drive the controller 120. Such a working memory 125 as, for example, a volatile memory may include at least one among an SRAM (static RAM), a DRAM (dynamic RAM) and an SDRAM (synchronous DRAM).

The error detection and correction circuit 126 may detect an error bit of target data and correct the detected error bit, by using an error correction code. The target data may be, for example, data stored in the working memory 125 or data read from the memory 110.

The error detection and correction circuit 126 may be realized to decode data by using an error correction code. The error detection and correction circuit 126 may be realized by various code decoders. For example, a decoder which performs unsystematic code decoding or a decoder which performs systematic code decoding may be used.

For example, the error detection and correction circuit 126 may detect an error bit by the unit of a set sector in each of read data. Namely, each read data may be constituted by a plurality of sectors. A sector may mean a data unit smaller than a page being the read unit of a flash memory. Sectors constituting each read data may be matched with one another by the medium of an address.

The error detection and correction circuit 126 may calculate a bit error rate (BER), and may determine whether an error is correctable or not, in the unit of sector. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, the error detection and correction circuit 126 may detect a sector which is determined to be uncorrectable to the last. There may be one or more sectors that are determined to be uncorrectable. The error detection and correction circuit 126 may transfer information (for example, address information) on a sector which is determined to be uncorrectable, to the processor 124.

A bus 127 may be configured to provide channels among the components 121, 122, 124, 125 and 126 of the controller 120. The bus 127 may include, for example, a control bus for transferring various control signals, commands and the likes, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. As the case may be, in addition to the above-described components 121, 122, 124, 125 and 126 of the controller 120, one or more other components may be added.

Hereinbelow, the memory 110 will be described in further detail with reference to FIG. 2.

Figure 2:
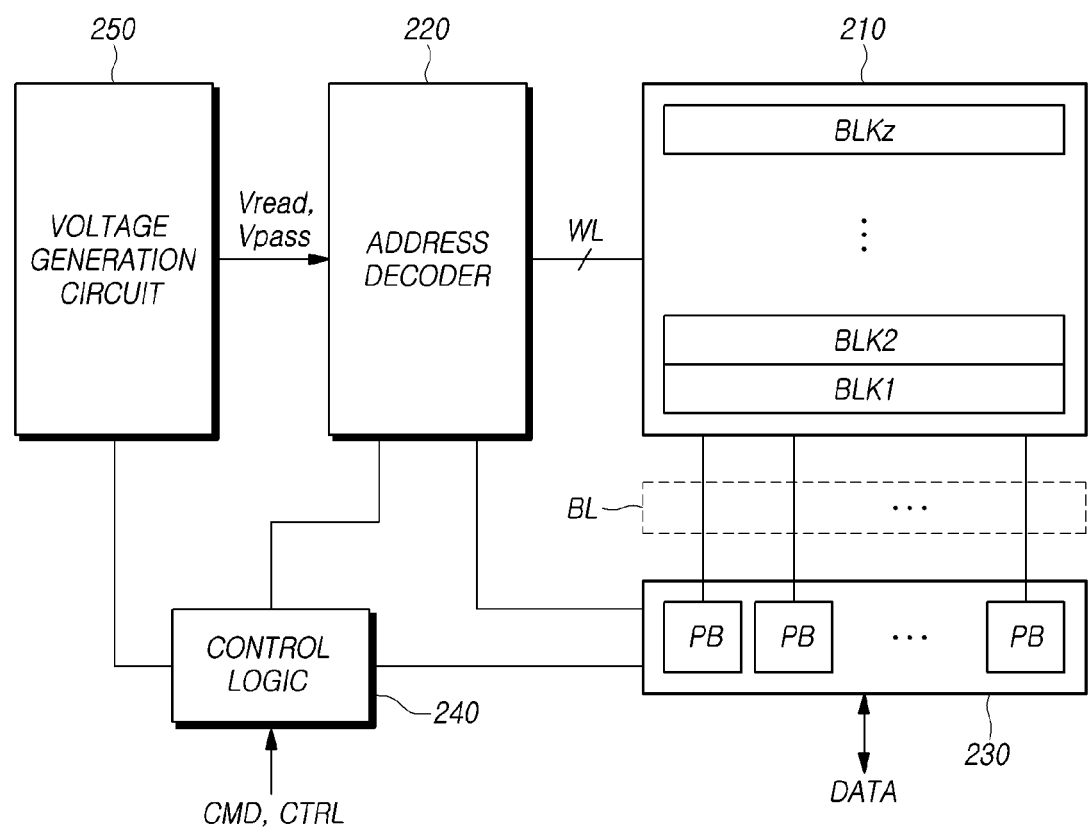
FIG. 2 is a block diagram schematically illustrating a memory of FIG. 1.

FIG. 2 is a diagram schematically illustrating the memory 110 of FIG. 1.

The memory 110 may include a memory cell array 210, an address decoder 220, a read and write circuit 230, a control logic 240, and a voltage generation circuit 250.

The memory cell array 210 may include a plurality of memory blocks BLK1 to BLKz (z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells which have vertical channel structures.

The memory cell array 210 may be configured by a memory cell array of a two-dimensional structure, or as the case may be, may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) which stores 1-bit data. For another instance, each of the plurality of memory cells included in the memory cell array 210 may be a multi-level cell (MLC) which stores 2-bit data. For still another instance, each of the plurality of memory cells included in the memory cell array 210 may be a triple level cell (TLC) which stores 3-bit data. For yet another instance, each of the plurality of memory cells included in the memory cell array 210 may be a quad level cell (QLC) which stores 4-bit data. For still yet another instance, the memory cell array 210 may include a plurality of memory cells, each of which stores or more-bit data.

The number of bits of data stored in each of the plurality of memory cells may be dynamically determined. For example, a single-level cell which stores 1-bit data may be changed to a triple-level cell which stores 3-bit data.

Referring to FIG. 2, the address decoder 220, the read and writhe circuit 230, the control logic 240 and the voltage generation circuit 250 may operate as a peripheral circuit which drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block in a read voltage applying operation during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one among a block address, a row address and a column address.

The address decoder 220 may select one memory block and one word line depending on a block address and a row address. A column address may be decoded by the address decoder 220 and be provided to the read and write circuit 230.

The address decoder 220 may include at least one among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit which includes a plurality of page buffers PB. The read and write circuit 230 may include data buffers which take charge of a data processing function, and as the case may be, may further include cache buffers which take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, that the amounts of current flowing depending on the programmed states of the corresponding memory cells are changed.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit and so forth in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell which is coupled to one of the plurality of word lines WL and one of the plurality of bit lines BL may be defined. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate which is surrounded by a dielectric and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

As the case may be, at least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
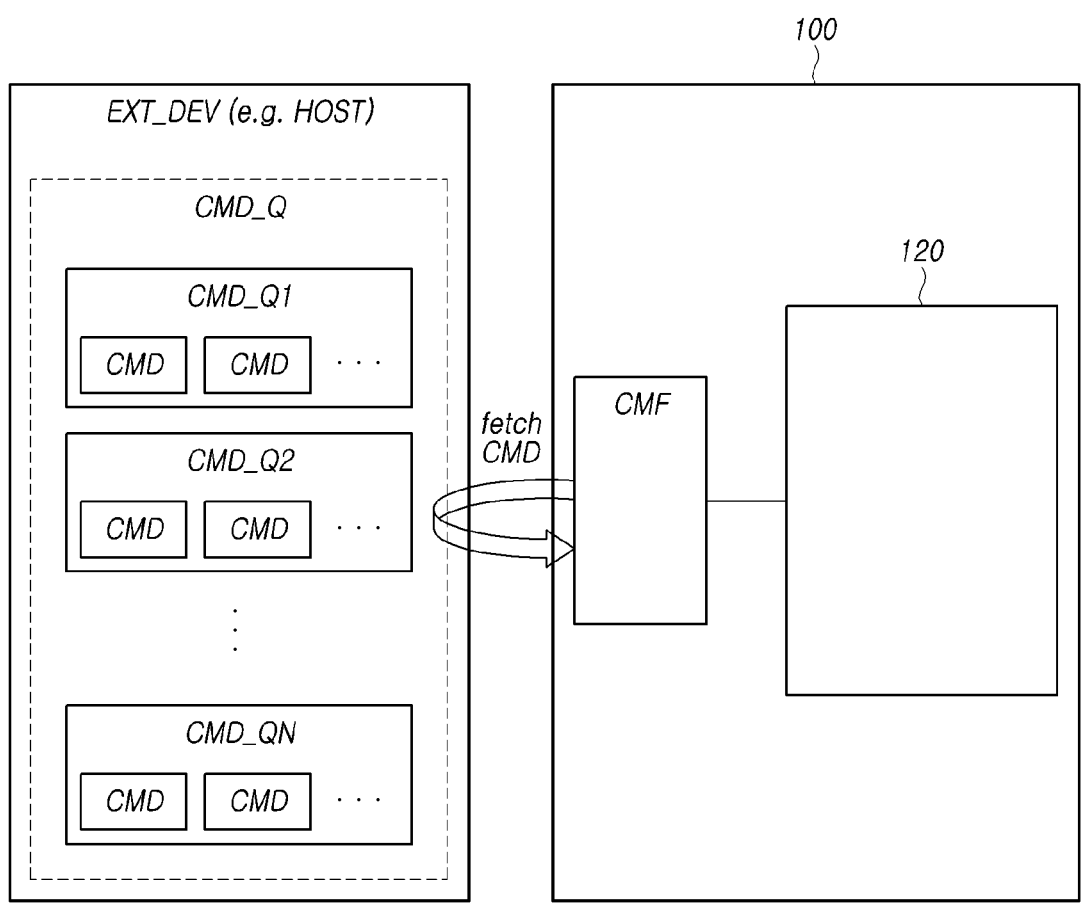
FIG. 3 schematically illustrates a structure of a storage device according to an embodiment of the disclosed technology.

FIG. 3 schematically illustrates a structure of a storage device 100 based on an embodiment of the disclosed technology.

The storage device 100 may include a command fetch circuit CMF and a controller 120.

The command fetch circuit CMF may fetch a command from a plurality of command queues CMD_Q. Fetching a command from the plurality of command queues CMD_Q means dequeuing a specific command from a specific command queue among the plurality of command queues CMD_Q.

In the embodiment of the disclosed technology, the plurality of command queues CMD_Q may be located in one or more devices outside the storage device 100 or the controller 120. An external device EXT_DEV in which the plurality of command queues CMD_Q are located may be, for example, a host. In FIG. 3, the external device EXT_DEV may use N number of command queues CMD_Q1, CMD_Q2, . . . , CMD_QN.

Each of the N number of command queues CMD_Q1, CMD_Q2, . . . , CMD_QN may queue one or more commands CMD.

The command fetch circuit CMF may transmit a command, fetched from the plurality of command queues CMD_Q, to the controller 120. Through this, the command fetch circuit CMF may request the controller 120 to process an operation indicated by the corresponding command.

The controller 120 may control the operation of the command fetch circuit CMF. For example, the controller 120 may provide an electrical signal instructing the operation of the command fetch circuit CMF to the command fetch circuit CMF.

For example, the controller 120 may determine a policy for the command fetch circuit CMF to use to fetch commands CMD from the plurality of command queues CMD_Q.

In detail, the controller 120 may determine a policy for the command fetch circuit CMF to fetch commands CMD from the plurality of command queues CMD_Q by selecting the policy from among a plurality of policies, e.g. a first policy and a second policy, on the basis of the state of a target command queue among the plurality of command queues CMD_Q. This will be described below in detail with reference to FIG. 4.

Figure 4:
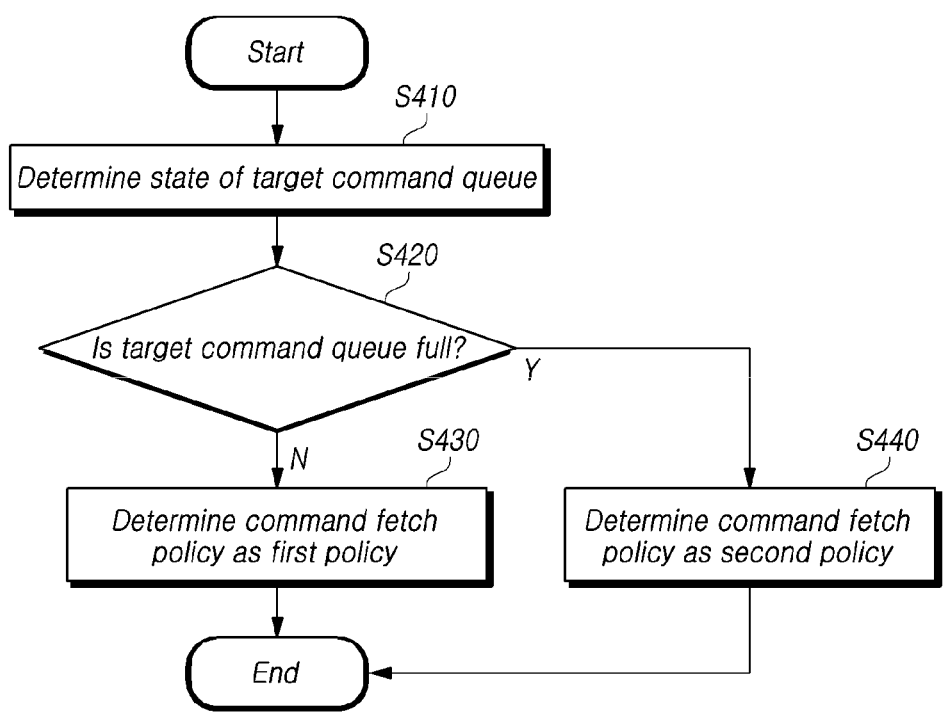
FIG. 4 is a flowchart illustrating an example of an operation of determining a command fetch policy by the storage device according to the embodiment of the disclosed technology.

FIG. 4 is a flowchart illustrating an example of an operation of determining a command fetch policy, which operation may be performed by the controller 120 of the storage device 100 based on the embodiment of the disclosed technology.

The controller 120 may determine the state of a target command queue among the plurality of command queues CMD_Q (S410).

In an illustrative embodiment, the controller 120 determines whether the target command queue is full (S420). The target command queue being full means that it is impossible to queue an additional command in the target command queue unless at least one command is dequeued from the target command queue.

For example, when the number of commands queued in the target command queue is equal to or greater than a set threshold number of commands, the controller 120 may determine that the target command queue is full.

For another example, the controller 120 may determine whether the target command queue is full on the basis of a pointer indicating the head of the target command queue and a pointer indicating the tail of the target command queue. For example, the controller 120 may determine that the target command queue is full when the pointer indicating the head of the target command queue and the pointer indicating the tail of the target command queue are adjacent to each other.

When it is determined that the target command queue is not full (S420-N), the controller 120 may determine a first policy as a policy for the command fetch circuit CMF to use to fetch a command from the plurality of command queues CMD_Q (S430).

On the other hand, when it is determined that the target command queue is full (S420-Y), the controller 120 may determine a second policy different from the first policy as a policy for the command fetch circuit CMF to use to fetch a command from the plurality of command queues CMD_Q (S440).

As such, if a policy for the command fetch circuit CMF to fetch a command is changed, an order in which the storage device 100 fetches commands from the plurality of command queues CMD_Q may be changed.

To illustrate an embodiment of the disclosed technology, first, examples of processes by which the storage device 100 may fetch a command will be described with reference to FIGS. 5 and 6. Next, examples of an operation in which the storage device 100 fetches a command according to a command fetch policy will be described with reference to FIGS. 7 and 8.

Figure 5:
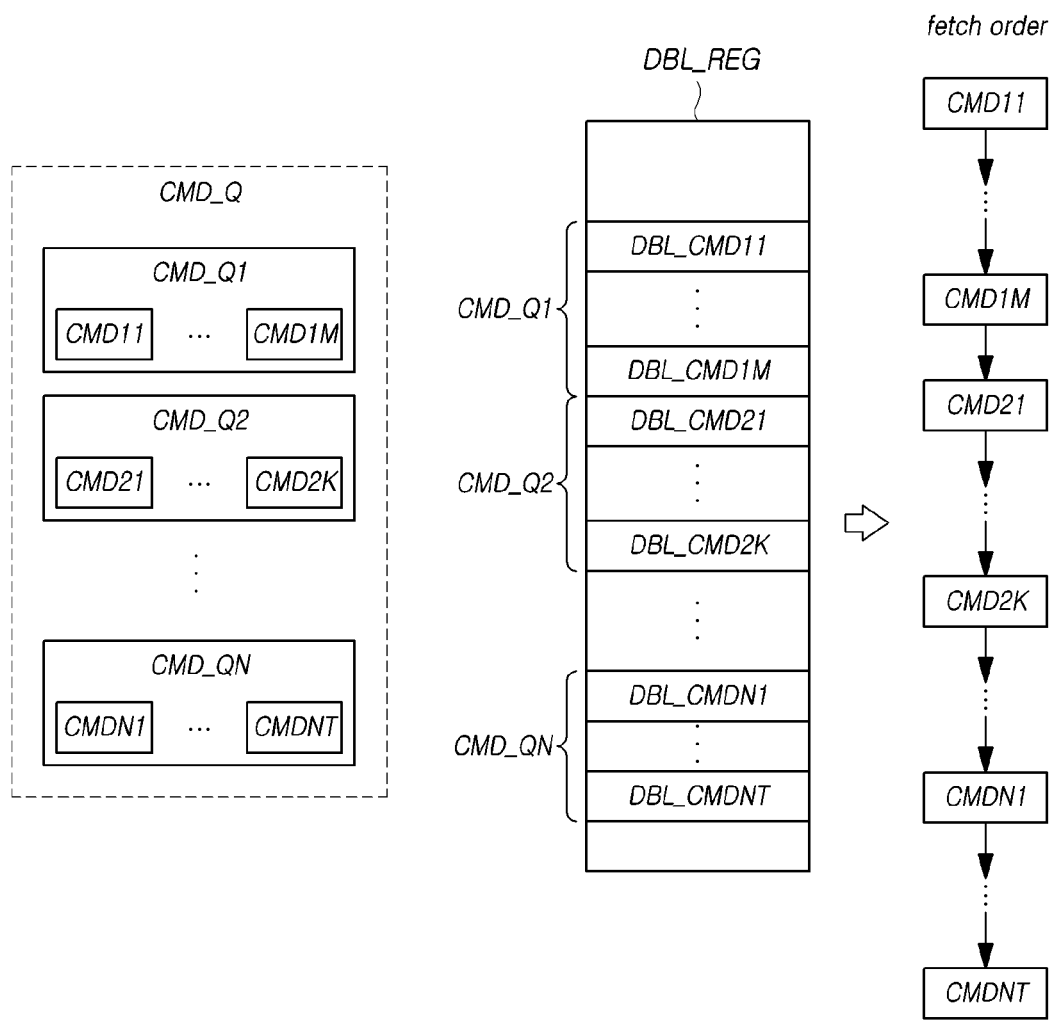
FIG. 5 illustrates an example of a command fetching operation such as may be performed by the storage device based on the embodiment of the disclosed technology.

FIG. 5 illustrates an example of a process for fetching a command by the storage device 100 based on the embodiment of the disclosed technology.

Referring to FIG. 5, the command fetch circuit CMF of the storage device 100 may fetch commands from the plurality of command queues CMD_Q according to order in which doorbell information on the plurality of command queues CMD_Q is inputted to a doorbell register DBL_REG of the storage device 100.

In FIG. 5, the N number of command queues CMD_Q1, CMD_Q2, . . . , CMD_QN may queue different numbers of commands, respectively. For example, the command queue CMD_Q1 may queue M number of commands CMD11, . . . , CMD1M, the command queue CMD_Q2 may queue K number of commands CMD21, . . . , CMD2K, and the command queue CMD_QN may queue T number of commands CMDN1, . . . , CMDNT.

When a command is queued in a specific command queue, doorbell information notifying this may be inputted to the doorbell register DBL_REG. The controller 120 of the storage device 100 may determine, on the basis of the doorbell information inputted to the doorbell register DBL_REG, that a command is queued in which command queue.

In FIG. 5, first, the M number of commands CMD11, . . . , CMD1M are queued in the command queue CMD_Q1, and M number of doorbell information DBL_CMD11, . . . , DBL_CMD1M is inputted to the doorbell register DBL_REG.

Next, the K number of commands CMD21, . . . , CMD2K are queued in the command queue CMD_Q2, and K number of doorbell information DBL_CMD21, . . . , DBL_CMD2K is inputted to the doorbell register DBL_REG.

Thereafter, lastly, the T number of commands CMDN1, . . . , CMDNT are queued in the command queue CMD_QN, and T number of doorbell information DBL_CMDN1, . . . , DBL_CMDNT is inputted to the doorbell register DBL_REG.

In the illustrated process, the storage device 100 may determine that the doorbell information DBL_CMD11, . . . , DBL_CMD1M is first inputted to the doorbell register DBL_REG. Accordingly, the command fetch circuit CMF of the storage device 100 may first fetch the commands CMD11, . . . , CMD1M, indicated by the doorbell information DBL_CMD11, . . . , DBL_CMD1M, from the command queue CMD_Q1.

Next, the storage device 100 may determine that the doorbell information DBL_CMD21, . . . , DBL_CMD2K is inputted to the doorbell register DBL_REG. Accordingly, the command fetch circuit CMF of the storage device 100 may next fetch the commands CMD21, . . . , CMD2K, indicated by the doorbell information DBL_CMD21, . . . , DBL_CMD2K, from the command queue CMD_Q2.

Next, the storage device 100 may determine that the doorbell information DBL_CMDN1, . . . , DBL_CMDNT is inputted to the doorbell register DBL_REG. Accordingly, the command fetch circuit CMF of the storage device 100 may next fetch the commands CMDN1, . . . , CMDNT, indicated by the doorbell information DBL_CMDN1, . . . , DBL_CMDNT, from the command queue CMD_QN.

When, in this way, the command fetch circuit CMF fetches commands from the plurality of command queues CMD_Q according to order in which doorbell information is inputted to the doorbell register DBL_REG, there is a possibility that the processing of commands whose doorbell information is inputted later is delayed.

Therefore, a problem may arise in that the storage device 100 cannot process a specific command within a predetermined time and thus a requirement for a command processing time may not be satisfied.

Figure 6:
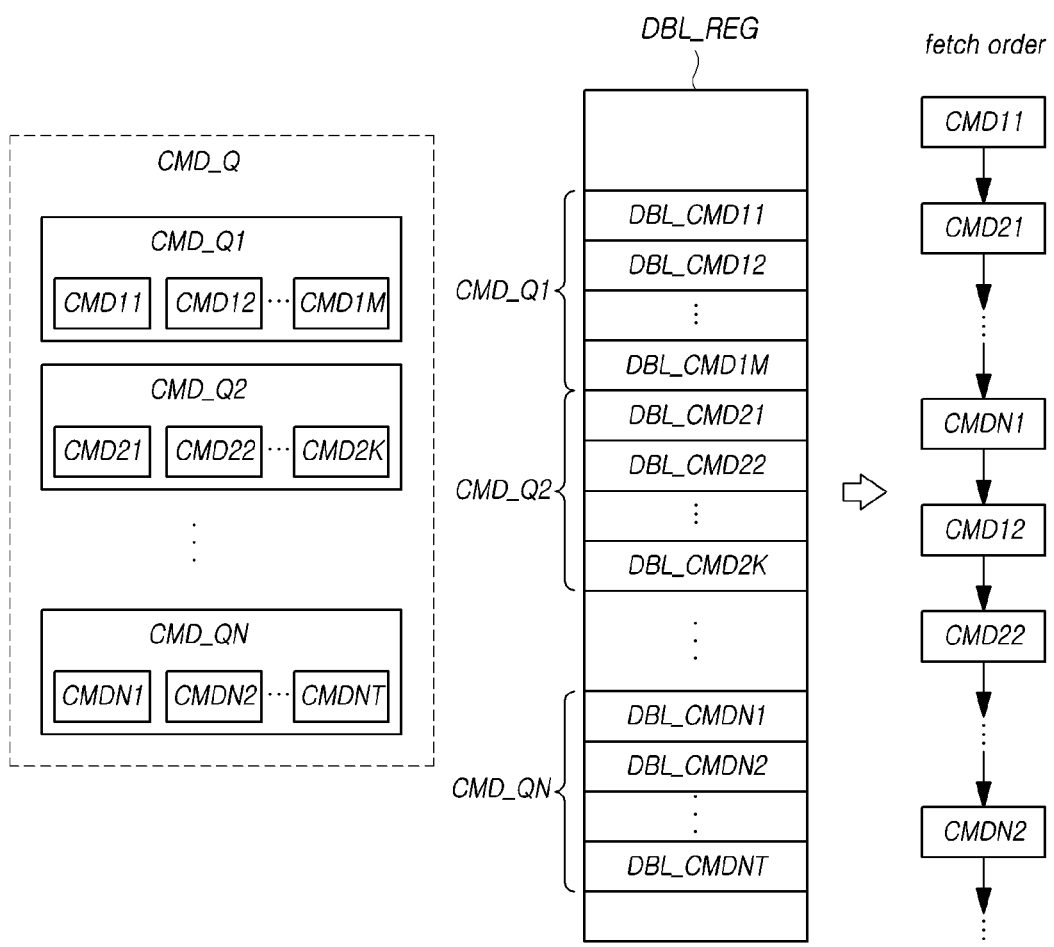
FIG. 6 illustrates another example of a command fetching operation such as may be performed by the storage device based on the embodiment of the disclosed technology.

FIG. 6 illustrates another example of a process of fetching a command by the storage device 100 based on the embodiment of the disclosed technology.

Referring to FIG. 6, the command fetch circuit CMF of the storage device 100 may fetch commands from the plurality of command queues CMD_Q in a round-robin manner.

Fetching commands from the plurality of command queues CMD_Q in a round-robin manner means that an operation of uniformly fetching a specific number of commands from each of the plurality of command queues CMD_Q is repeated.

In the same manner as described with respect to FIG. 5, the command queue CMD_Q1 may queue M number of commands CMD11, . . . , CMD1M, the command queue CMD_Q2 may queue K number of commands CMD21, . . . , CMD2K, and the command queue CMD_QN may queue T number of commands CMDN1, . . . , CMDNT.

The command fetch circuit CMF may fetch a specific number of commands from each of the plurality of command queues CMD_Q regardless of the order in which doorbell information is inputted to the doorbell register DBL_REG.

In the process illustrated in FIG. 6, the command fetch circuit CMF may fetch one command from each of the plurality of command queues CMD_Q that have at least one command queued in them before fetching any subsequent commands from another of the command queues CMD_Q. However, the number of commands which the command fetch circuit CMF fetches from one command queue at one time is not limited to the embodiment described with reference to FIG. 6. For example, the command fetch circuit CMF may fetch up to two or three commands from each of the plurality of command queues CMD_Q before fetching any commands from the next of the command queues CMD_Q.

In FIG. 6, the command fetch circuit CMF may first fetch the command CMD11 from the command queue CMD_Q1 and then fetch the command CMD21 from the command queue CMD_Q2. Although the doorbell information DBL_CMD12 on the command CMD12 queued in the command queue CMD_Q1 is inputted to the doorbell register DBL_REG prior to the doorbell information DBL_CMD21 on the command CMD21 queued in the command queue CMD_Q2, the command fetch circuit CMF fetches the command CMD21 prior to the command CMD12 so as to fetch commands in the round-robin manner.

In FIG. 6, the command fetch circuit CMF may repeat a process of fetching commands from the N number of command queues CMD_Q1, CMD_Q2, . . . , CMD_QN one by one and then fetching again commands from the N number of command queues CMD_Q1, CMD_Q2, . . . , CMD_QN one by one. Accordingly, the command CMD12 queued in the command queue CMD_Q1 may be fetched by the command fetch circuit CMF after commands are fetched one by one from the N number of command queues CMD_Q1, CMD_Q2, . . . , CMD_QN.

When, in this way, the command fetch circuit CMF fetches commands from the plurality of command queues CMD_Q in the round-robin manner, a command whose doorbell information is inputted later may be executed before the processing of a command whose doorbell information was inputted earlier is executed.

Therefore, it is possible to prevent a problem in which a requirement for a command processing time is not satisfied because the storage device 100 could not process a specific command within a predetermined time. In addition, by uniformly fetching commands from the plurality of command queues CMD_Q, a deviation in command processing latency for each of the plurality of command queues CMD_Q may be minimized.

Figure 7:
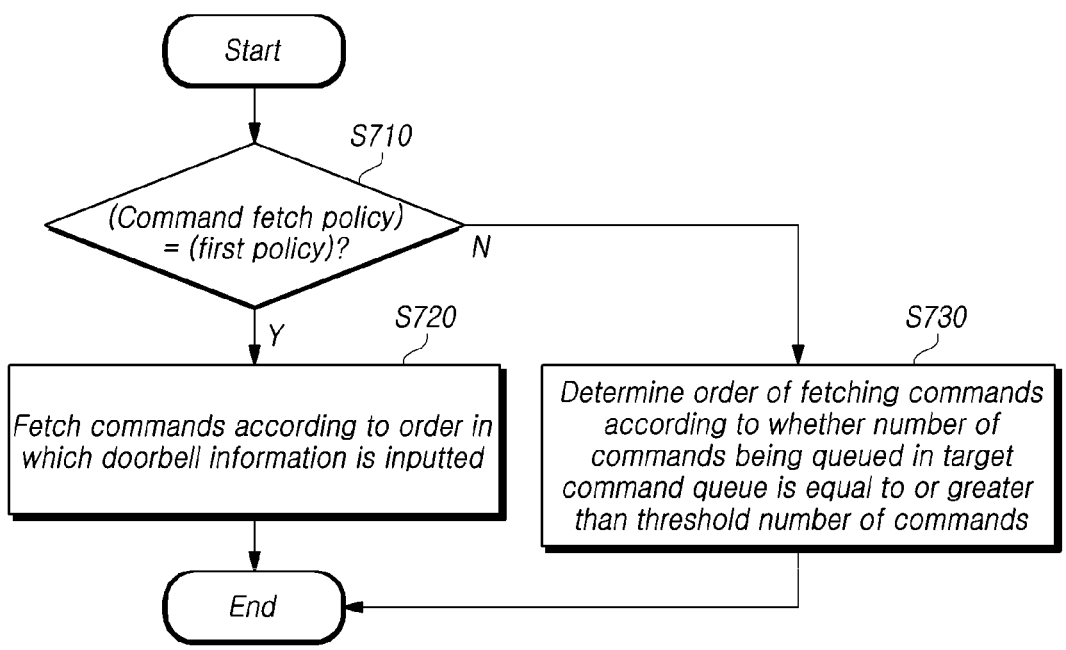
FIG. 7 is a flowchart illustrating an example of an operation of fetching a command according to a command fetch policy by the storage device based on the embodiment of the disclosed technology.

FIG. 7 is a flowchart illustrating an example of an operation of fetching a command according to a command fetch policy by the storage device 100 based on the embodiment of the disclosed technology.

Referring to FIG. 7, the command fetch circuit CMF of the storage device 100 determines whether a policy for fetching commands from the plurality of command queues CMD_Q is the first policy (S710).

For example, as described above with reference to FIG. 4, the controller 120 of the storage device 100 may determine a policy for fetching commands from the plurality of command queues CMD_Q as being either the first policy or the second policy. The operation described with reference to FIG. 7 may be started after the controller 120 determines the command fetch policy as the first policy (S430) in FIG. 4 or determines the command fetch policy as the second policy (S440) in FIG. 4.

When it is determined that the policy for fetching commands from the plurality of command queues CMD_Q is the first policy (S710-Y), then as described above with reference to FIG. 5, the command fetch circuit CMF may fetch commands from the plurality of command queues CMD_Q according to an order in which doorbell information on commands queued in the plurality of command queues CMD_Q was inputted to the doorbell register DBL_REG (S720).

On the other hand, when it is determined that the policy for fetching commands from the plurality of command queues CMD_Q is not the first policy (i.e., when it is determined that the policy is the second policy) (S710-N), the command fetch circuit CMF may instead determine the order of fetching commands from the plurality of command queues CMD_Q according to whether the number of commands queued in a target command queue is equal to or greater than a set threshold number of commands (S730).

An example of the operation performed at step S730 will be described below in detail with reference to FIG. 8. The operation to be described below with reference to FIG. 8 may be started while or after step S730 is executed.

Figure 8:
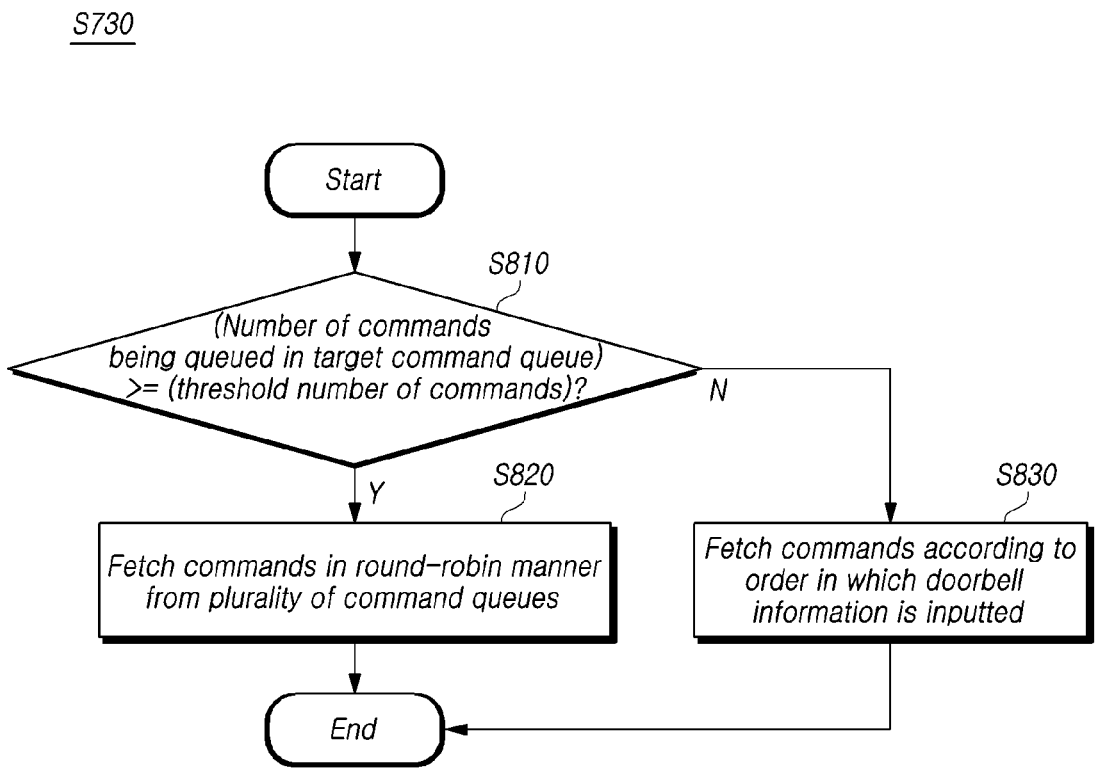
FIG. 8 is a flowchart illustrating an example of an operation of fetching a command when the command fetch policy is a second policy, by the storage device based on the embodiment of the disclosed technology.

FIG. 8 is a flowchart illustrating an example of an operation of fetching a command when the command fetch policy is a second policy by the storage device 100 based on the embodiment of the disclosed technology.

The controller 120 of the storage device 100 determines whether the number of commands queued in a target command queue is equal to or greater than a threshold number of commands (S810).

For example, the threshold number of commands may be determined as a value obtained by multiplying a maximum number of commands capable of being queued in the target command queue by a predetermined percentage (e.g., 80%).

When it is determined that the number of commands queued in the target command queue is equal to or greater than the threshold number of commands (S810-Y), then as described above with reference to FIG. 6, the command fetch circuit CMF of the storage device 100 may fetch commands from the plurality of command queues CMD_Q in the round-robin manner (S820).

On the other hand, when it is determined that the number of commands queued in the target command queue is less than the threshold number of commands (S810-N), the controller 120 of the storage device 100 may change the command fetch policy to the first policy.

The reason for this is that, when the number of commands being queued in the target command queue is less than the threshold number of commands, because this may indicate a state in which commands are not concentrated in the target command queue, overall command processing performance may be improved when the storage device 100 fetches commands in the order in which doorbell information is inputted.

Accordingly, as in the process described above with reference to FIG. 5, at step S830 the command fetch circuit CMF of the storage device 100 may fetch commands from the plurality of command queues CMD_Q according to the order in which doorbell information on commands inputted to the plurality of command queues CMD_Q is inputted to the doorbell register DBL_REG.

Figure 9:
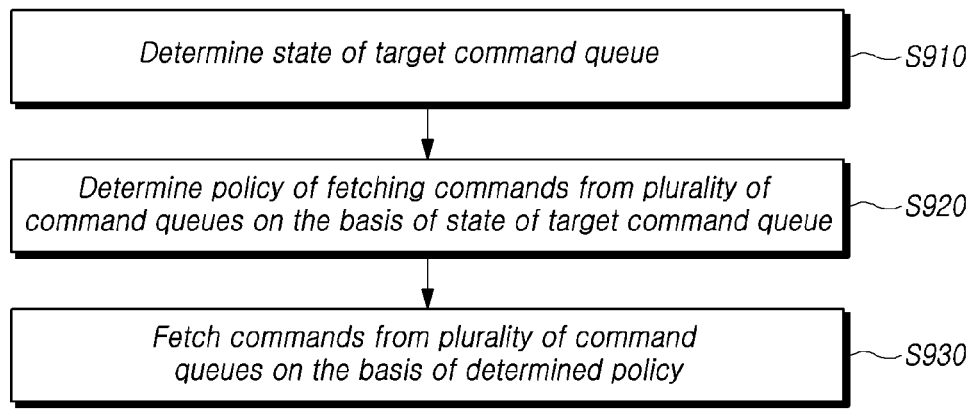
FIG. 9 is a flowchart illustrating a process for operating a storage device based on an embodiment of the disclosed technology.

FIG. 9 is a flowchart illustrating a process for operating the storage device 100 based on an embodiment of the disclosed technology.

Referring to FIG. 9, the process for operating the storage device 100 may include determining a state of a target command queue among the plurality of command queues CMD_Q (S910).

The process for operating the storage device 100 may include determining a policy for fetching commands from the plurality of command queues CMD_Q as a first policy or a second policy on the basis of the state of the target command queue (S920).

For example, at step S920, the command fetch policy may be determined as the first policy when the target command queue is not full, and may be determined as the second policy when the target command queue is full.

The process for operating the storage device 100 may include fetching commands from the plurality of command queues CMD_Q on the basis of the policy determined at step S920 (S930).

For example, at step S930, when the policy determined at the S920 is the first policy, commands may be fetched from the plurality of command queues CMD_Q according to order in which doorbell information on commands inputted to the plurality of command queues CMD_Q is inputted to the doorbell register DBL_REG.

For example, step S930 may include determining, when the policy determined at step S920 is the second policy, whether the number of commands queued in the target command queue is equal to or greater than a set threshold number of commands, and differently determining an order of fetching commands from the plurality of command queues CMD_Q depending on whether the number of commands queued in the target command queue is equal to or greater than the threshold number of commands.

At step S930, when the number of commands queued in the target command queue is equal to or greater than the threshold number of commands, commands may be fetched from the plurality of command queues CMD_Q in a round-robin manner.

On the other hand, at step S930, when the number of commands queued in the target command queue is less than the threshold number of commands, the policy determined at step S920 may be changed to be the first policy.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
a command fetch circuit configured to fetch commands from a plurality of command queues; and
a controller configured to determine, according to a state of a target command queue among the plurality of command queues, a policy for the command fetch circuit to use to fetch commands from the plurality of command queues by selecting one from among a first policy and a second policy,
wherein the controller determines the policy as the first policy when the target command queue is not full, and determines the policy as the second policy when the target command queue is full.

2. The storage device according to claim 1, wherein when the policy is determined as the first policy, the command fetch circuit fetches commands from the plurality of command queues according to an order in which doorbell information on commands queued in the plurality of command queues is inputted to a doorbell register.

3. The storage device according to claim 1, wherein when the policy is determined as the second policy, the command fetch circuit determines an order of fetching commands from the plurality of command queues based on whether the number of commands queued in the target command queue is equal to or greater than a set threshold number of commands.

4. The storage device according to claim 3, wherein when the policy is determined as the second policy and the number of commands queued in the target command queue is equal to or greater than the threshold number of commands, the command fetch circuit fetches commands from the plurality of command queues in a round-robin manner.

5. The storage device according to claim 3, wherein when the policy is determined as the second policy and the number of commands queued in the target command queue is less than the threshold number of commands, the controller changes the policy to the first policy.

6. A method for operating a storage device, comprising:
determining a state of a target command queue among a plurality of command queues;
determining a policy for fetching commands from the plurality of command queues, by selecting one from among a first policy and a second policy on the basis of the state of the target command queue; and
fetching commands from the plurality of command queues on the basis of the determined policy,
wherein determining the policy includes:
determining the policy as the first policy when the target command queue is not full, and
determining the policy as the second policy when the target command queue is full.

7. The method according to claim 6, wherein when the policy is the first policy, fetching commands from the plurality of command queues includes fetching commands from the plurality of command queues according to an order in which doorbell information on commands queued in the plurality of command queues is inputted to a doorbell register.

8. The method according to claim 6, wherein fetching commands from the plurality of command queues comprises:
when the policy is the second policy:
determining whether the number of commands queued in the target command queue is equal to or greater than a set threshold number of commands; and
determining an order of fetching commands from the plurality of command queues based on whether the number of commands queued in the target command queue is equal to or greater than the threshold number of commands.

9. The method according to claim 8, wherein when the policy is the second policy and the number of commands queued in the target command queue is equal to or greater than the threshold number of commands, fetching commands from the plurality of command queues fetches commands from the plurality of command queues in a round-robin manner.

10. The method according to claim 9, wherein when the policy is the second policy and the number of commands being queued in the target command queue is less than the threshold number of commands, fetching commands from the plurality of command queues includes changing the policy to the first policy.

11. A controller comprising:
a memory interface capable of communicating with a memory capable of storing data; and
a control circuit configured to:
determine, based on a number of commands queued in a target command queue among a plurality of command queues, an order for fetching commands queued in a plurality of command queues, and
process operations indicated by commands fetched from the plurality of command queues,
wherein the control circuit determines the order as a first order when the target command queue is not full, and determines the order as a second order different from the first order when the target command queue is full.

12. The controller of claim 11, wherein the plurality of command queues are external to the controller.

* * * * *